United States Patent
Chun et al.

(10) Patent No.: US 8,549,491 B2
(45) Date of Patent: Oct. 1, 2013

(54) APPARATUS AND METHOD FOR APPLICATION TESTING OF EMBEDDED SYSTEM

(75) Inventors: Ingeol Chun, Seoul (KR); Taeho Kim, Gyeonggi-do (KR); Chaedeok Lim, Daejeon (KR); Seungmin Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 987 days.

(21) Appl. No.: 12/620,755

(22) Filed: Nov. 18, 2009

(65) Prior Publication Data

US 2010/0146487 A1    Jun. 10, 2010

(30) Foreign Application Priority Data

Dec. 5, 2008  (KR) .................. 10-2008-0123471
May 12, 2009  (KR) .................. 10-2009-0041124

(51) Int. Cl.
*G06F 9/44* (2006.01)

(52) U.S. Cl.
USPC ........... 717/134; 717/100; 717/101; 717/124; 717/125; 717/126; 717/127; 717/128; 717/129; 717/131; 717/135; 703/13; 703/20; 703/21; 703/23

(58) Field of Classification Search
None
See application file for complete search history.

(56) References Cited

U.S. PATENT DOCUMENTS

| | | | |
|---|---|---|---|
| 5,911,059 A * | 6/1999 | Profit, Jr. | 703/23 |
| 7,010,780 B2 * | 3/2006 | Perycz et al. | 717/107 |
| 8,117,587 B1 * | 2/2012 | Testardi | 717/100 |
| 2002/0059054 A1 * | 5/2002 | Bade et al. | 703/20 |
| 2002/0188434 A1 * | 12/2002 | Shulman et al. | 703/21 |
| 2003/0056193 A1 * | 3/2003 | Perycz et al. | 717/107 |
| 2005/0055665 A1 | 3/2005 | Woo et al. | 717/101 |
| 2006/0136904 A1 * | 6/2006 | Weidman et al. | 717/172 |
| 2006/0190930 A1 * | 8/2006 | Hecht et al. | 717/128 |
| 2007/0006159 A1 * | 1/2007 | Hecht et al. | 717/124 |
| 2008/0178143 A1 * | 7/2008 | Dougan et al. | 717/100 |
| 2008/0263505 A1 * | 10/2008 | StClair et al. | 717/101 |
| 2008/0282229 A1 * | 11/2008 | Kim et al. | 717/124 |

(Continued)

FOREIGN PATENT DOCUMENTS

EP        1280061 A2 *    1/2003
JP     2005-85255         3/2005

(Continued)

OTHER PUBLICATIONS

'Testing Embedded Software using Simulated Hardware' by Jakob Engblom et al., ERTS 2006.*

(Continued)

*Primary Examiner* — Steven Snyder
(74) *Attorney, Agent, or Firm* — Staas & Halsey LLP

(57) ABSTRACT

Provided is to an apparatus for application testing of an embedded system which can cross-develop an application program installed in the embedded system regardless of the type of a target system. A virtual environment for testing the application program adopted in the target system is constructed on the basis of information inputted through a user interface and the application program is tested by configuring a virtual target system in the constructed virtual environment. According to the present invention, the application program adopted in the target system can be developed and tested without constructing a cross-development environment for each target system in an environment in which various kinds of embedded systems are developed.

13 Claims, 6 Drawing Sheets

(56) References Cited

U.S. PATENT DOCUMENTS

| | | | |
|---|---|---|---|
| 2009/0217163 A1* | 8/2009 | Jaroker | 715/700 |
| 2009/0327996 A1* | 12/2009 | Siegemund et al. | 717/107 |
| 2011/0167250 A1* | 7/2011 | Dicks et al. | 713/2 |
| 2011/0179405 A1* | 7/2011 | Dicks et al. | 717/168 |

FOREIGN PATENT DOCUMENTS

| | | |
|---|---|---|
| KR | 10-2003-0010145 | 2/2003 |
| KR | 10-2005-0111100 | 11/2005 |
| KR | 10-2005-0119885 | 12/2005 |
| KR | 10-2008-0052341 | 6/2008 |
| KR | 10-2008-0066402 | 7/2008 |

OTHER PUBLICATIONS

K.J. Paek et al., "A Trend of USN Software Development Tool," Electronics and Telecommunications Trends, vol. 23, No. 1, Feb. 2008, pp. 21-32.

* cited by examiner

HOST SYSTEM     TARGET SYSTEM

APPARATUS AND METHOD FOR APPLICATION TESTING OF EMBEDDED SYSTEM

RELATED APPLICATIONS

The present application claims priority to Korean Patent Application Serial Number 10-2008-0123471, filed on Dec. 5, 2008 and Korean Patent Application Serial Number 10-2009-041124, filed on May 12, 2009, the entirety of which is hereby incorporated by references.

BACKGROUND OF THE INVENTION

1. Field of the Invention

The present invention relates to an apparatus and a method for application testing of an embedded system, and more particularly, to an apparatus and a method for application testing for cross-developing an application program installed in an embedded system regardless of a type of a target system and applying a developed environment to a corresponding target system.

2. Description of the Related Art

An embedded system is designed to perform a predetermined response or process with respect to user or external input unlike a general computer system. Further, the embedded system cannot directly develop a used application program and should use an application program developed in another computer system.

Since most of the embedded systems low-cost small systems unlike the general computer system, a memory adopted in the embedded system is small in size, slow in speed, and small in capacity. Therefore, since works such as development of the application program and a test in the embedded system cannot be performed, a new computer system is required to develop the application program adopted in the embedded system.

However, since the embedded system has only necessary functions, an application program required for various embedded systems in one common development environment cannot be developed. Accordingly, in order to develop the application program in the embedded system, each embedded system should have a development environment for developing the application program. Consequently, much cost is incurred, and economical and temporal costs of requiring a knowledge of various systems to a developer, etc. are required.

In general, a process of developing the application program in a host system is performed in the following sequence.

First, the developer prepares the application program in the host system. Second, the host system creates an applicable program which can execute the prepared application program by using a cross-development environment suitable for a target system. Third, the host system transmits the created application program to the target system. Fourth, the transmitted application program is executed in the target system. Fifth, when the application program is tested in the target system, the developed application program is tested by separately performing the test program. Sixth, when an error occurs, the application program is modified in the host system. Seventh, the steps starting from the second step is repeated until the application program is perfectly developed.

Therefore, the process of developing the application program required for the embedded system is performed in a complex manner. Further, when the target system is changed, the cross-development environment should be replaced by an environment suitable for the changed target system and installed and when various kinds of embedded systems are developed, both a development environment and a target system that are suitable for each embedded system should be provided and administrated.

Therefore, it is very difficult to develop various embedded systems at the same time by such a method and as a result, a technology which can find the resultant problem is strongly required.

SUMMARY OF THE INVENTION

In order to solve the above-mentioned problem, an object of the present invention is to provide an apparatus and a method for application testing of an embedded system which can develop an application program that can be driven in the embedded system and test the developed application program.

Further, another object of the present invention is to provide an apparatus and a method for application testing of an embedded system which do not construct cross-development environments for target systems in an environment in which various kinds of embedded systems are developed and automatically cross-develop and test an application program used for a target system.

In order to achieve the above-mentioned objects, an apparatus for application testing of an embedded system according to an embodiment of the present invention includes: a user interface; a virtual cross-development environment manager that constructs a virtual environment for testing an application program can be adopted in a target system on the basis of information inputted through the user interface; and a virtual target environment manager that configure a virtual target system corresponding to the target system in the virtual environment constructed by the virtual cross-development environment manager and verifies whether or not an error occurs in an application program by executing the corresponding application program on the virtual target system.

The virtual cross-development environment manager constructs a plurality of virtual environments corresponding to a plurality of target systems.

The virtual cross-development environment manager includes an application program creator that creates the application program in the virtual environment by using a source of the application program inputted through the user interface.

The virtual cross-development environment manager further includes an application program tester that outputs a test result of the application program and controls to perform an operation corresponding to the test result.

The virtual target environment manager includes an emulator that emulates the application program created by the virtual cross-development environment manager in the virtual target system.

The virtual target environment manager verifies whether or not the error occurs in the application program executed in the emulator on the basis of test information of the application program inputted through the user interface.

The test information of the application program includes an input value inputted while executing the application program and a result value corresponding to the input value.

The apparatus for application testing of an embedded system further includes an information storage that stores environment setting information of the target system and information on the application program.

Meanwhile, in order to achieve the above-mentioned objects, a method for application testing of an embedded system according to another embodiment of the present invention includes: receiving information on a target system; constructing a virtual environment for testing an application program to be adopted in the corresponding target system on the basis of the inputted information on the target system; setting a virtual target system environment corresponding to the target system in the virtual environment and executing the application program in the virtual target system environment; and verifying whether or not an error occurs in the application program in accordance with an execution result at the executing the application program.

In constructing the virtual environment, a plurality of virtual environments corresponding to target systems are constructed.

The method for application testing of an embedded system further includes creating the application program in the virtual environment by receiving a source of the application program adopted in the target system.

The method for application testing of an embedded system further includes receiving test information of the application program, wherein in verifying whether or not the error occurs in the application program, it is determined whether or not the error occurs in the corresponding application program by comparing the execution result of the application program and the test information of the application program with each other.

The test information of the application program includes an input value inputted while executing the application program and a result value corresponding to the input value.

The method for application testing of an embedded system further includes modifying the source of the application program when the error occurs in the application program based on the verification result at verifying whether or not the error occurs in the application program.

The method for application testing of an embedded system further includes reverifying whether or not the error occurs in an application program created by adopting a source of the application program modified at modifying the source of the application program.

The method for application testing of an embedded system further includes transmitting the corresponding application program to the target system when no error occurs in the application program from the verification result at verifying whether or not the error occurs in the application program.

According to an embodiment of the present invention, a user can develop an application program in a corresponding target system can be adopted without constructing an environment for each target category which is adopted in various kinds of embedded systems and the developed application program can also be tested before being actually adopted in the target system.

Further, according to the embodiment of the present invention, even when an error occurs in the developed application program, the application program can be easily modified. In addition, it is possible to easily adopt the finally developed application program in the target system.

DETAILED DESCRIPTION OF THE PREFERRED EMBODIMENTS

Hereinafter, embodiments of the present invention will be described in detail with reference to the accompanying drawings.

Figure 1:
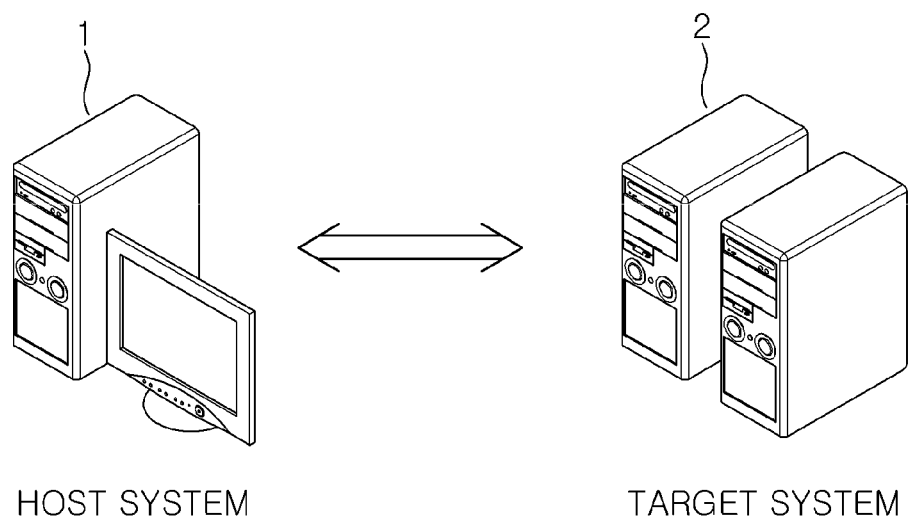
FIG. 1 is a diagram illustrating a configuration of a system in which an embodiment of the present invention is adopted.

FIG. 1 is a diagram illustrating a configuration of a system for developing and testing an application program of an embedded system according to an embodiment of the present invention.

As shown in FIG. 1, the application testing apparatus of an embedded system includes a host system 1 that develops an embedded application program and a target system 2 in which the application program developed in the host system 1 is actually adopted.

The host system 1 constructs a virtual cross-development environment suitable for the target system 2 which will be adopted in the embedded system. At this time, the host system 1 develops an application program suitable for the target system 2 in the virtual cross-development environment. Further, the host system 1 establishes a virtual target system environment in which a corresponding application program will adopt for actually testing the developed application program. Accordingly, the host system 1 can predict an operation at the time of adopting the application program in the actual target system 2 by testing the application program developed in the virtual target system environment.

That is, the application testing apparatus of the embedded system is implemented in the host system 1. A detailed description thereof will be performed with reference to FIGS. 2 and 4.

The host system 1 and the target system 2 are physically connected to each other by a wired or wireless method. For example, the host system 1 and the target system 2 can be connected to each other by using a serial port, an Ethernet port, or the like and may be connected to each other by using an interface such as JTAG for hardware control. When the host system 1 is connected with the target system 2, the host system 1 transmits the application program to the target system 2.

The target system 2 is the embedded system. When the application program developed by the host system 1 is installed in the target system 2, the target system 2 is operated by the corresponding application program.

Figure 2:
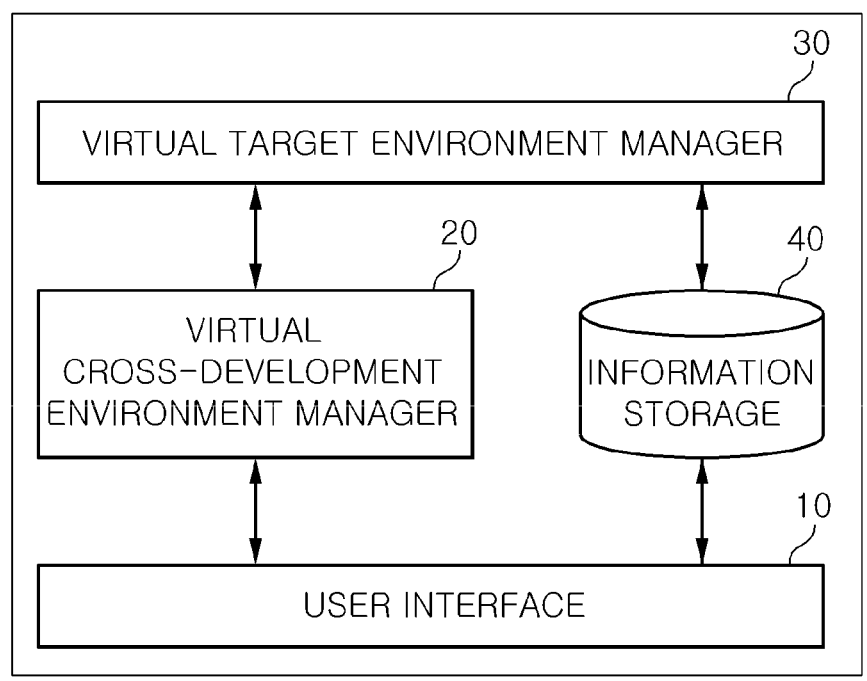
FIG. 2 is a block diagram illustrating a configuration of an apparatus for application testing of an embedded system according to an embodiment of the present invention.

FIG. 2 is a block diagram illustrating a configuration of an apparatus for application testing of an embedded system according to an embodiment of the present invention.

Referring to FIG. 2, a development environment testing apparatus of the embedded target system according to an embodiment of the present invention includes a user interface 10, a virtual cross-development environment manager 20, and a virtual target environment manager 30. Further, the application testing apparatus of the embedded system further includes an information storage 40.

The user interface 10 inputs a source of the application program into the application testing apparatus of the embedded system provided in the present invention and inputs setting information required to develop the corresponding application program.

The virtual cross-development environment manager 20 configures a virtual cross-development environment required depending on the characteristics of the target system 2 and creates the application program by automatically selecting the virtual cross-development environment corresponding to the corresponding target system 2.

The virtual target environment manager 30 provides a virtual target system environment for operating or testing the application program created by the virtual cross-development environment manager 20 in the virtual cross-development environment.

Information on a plurality of target systems 2 is stored in the information storage 40. Further, setting information of each target system 2 and setting information on the virtual cross-development environment manager 20 and the virtual target environment manager 30 are stored in the information storage 40.

Figure 3:
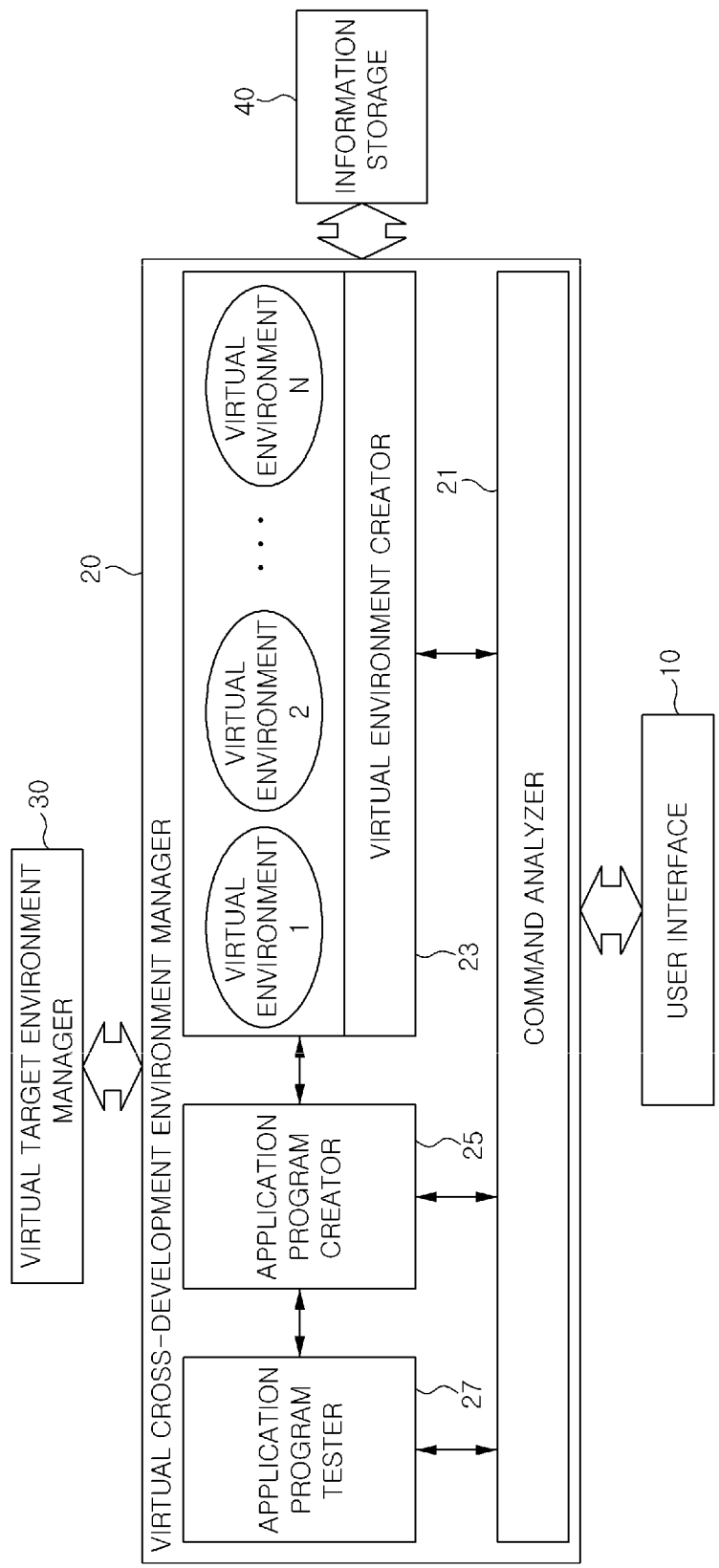
FIG. 3 is a block diagram illustrating a configuration of a virtual cross-development environment manager according to an embodiment of the present invention.

Referring to FIG. 3, a configuration of the virtual cross-development environment manager will be described in more detail below. FIG. 3 is a block diagram illustrating a configuration of a virtual cross-development environment manager according to an embodiment of the present invention.

As shown in FIG. 3, the virtual cross-development environment manager 20 includes a command analyzer 21, a virtual environment creator 23, an application program creator 25, and an application program tester 27.

The command analyzer 21 analyzes a user command inputted through the user interface 10 and commands the necessary work in accordance with the analyzed user command.

The virtual environment creator 23 creates a virtual environment for producing an application program to be driven in the target system 2 and manages the created virtual environment. Herein, the virtual environment means a virtual cross-development environment created depending on the characteristics of the target system 2. At this time, the application program creator 25 creates the application program in the virtual environment created by the virtual environment creator 23.

The application program tester 27 tests whether or not the application program created from the application program creator 25 can be adopted in the target system 2. For this, the application program tester 27 outputs the application program to the virtual target environment manager 30 to execute the corresponding application program. At this time, in addition to the application program, the application program tester 27 outputs test information including an input value required while executing the application program and an output value corresponding thereto to the virtual target environment manager 30.

The application program tester 27 receives a test result of the corresponding application program from the virtual target environment manager 30. In other words, the application program tester 27 receives whether or not an error occurs while executing the corresponding application program.

When the error occurs from the test result of the corresponding application program, the application program tester 27 outputs the test result to the outside and allows the user interface 10 to modify the source of the corresponding application program. Meanwhile, when no error occurs from the test result of the corresponding application program, the application program tester 27 provides the corresponding application program to the target system 2.

Figure 4:
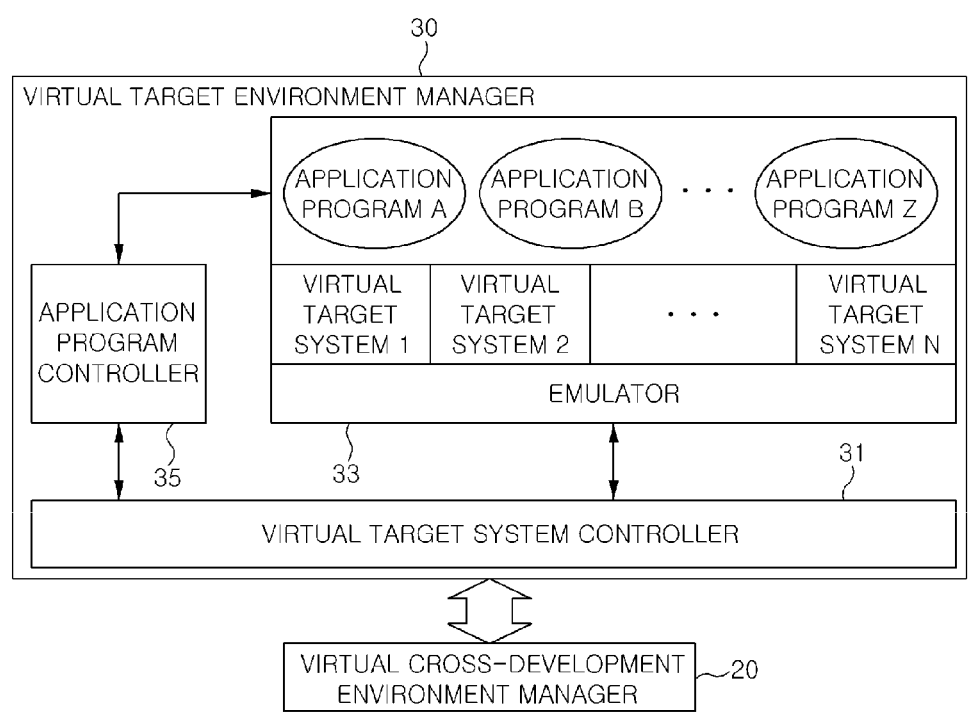
FIG. 4 is a block diagram illustrating a configuration of a virtual target environment manager according to an embodiment of the present invention.

Meanwhile, referring to FIG. 4, the configuration of the virtual target environment manager of FIG. 2 will be described in more detail below. FIG. 4 is a block diagram illustrating a configuration of a virtual target environment manager according to an embodiment of the present invention.

As shown in FIG. 4, the virtual target environment manager 30 includes a virtual target system controller 31, an emulator 33, and an application program controller 35.

The virtual target system controller 31 controls operations of the emulator 33 and the application program controller 35, and manipulates a virtual target environment.

The emulator 33 sets a virtual target system environment in the virtual environment. Therefore, the virtual target system environment is implemented in the virtual environment. The application program created by the application program creator 25 is transferred to the emulator 33.

The application program controller 35 outputs a signal for controlling driving of the application program to the emulator 33 in accordance with a command of the virtual target system controller 31. As a result, the emulator 33 emulates the application program in the virtual target system environment in accordance with a control command of the application program controller 35. The emulator 33 outputs an execution result of the application program to the application program controller 35.

Meanwhile, the virtual target environment manager 30 receives test information of the application program when receiving the application program from the virtual cross-development environment manager 20. At this time, the test information received from the application program tester 27 includes an input value and an output value which are generated by executing the corresponding application program.

Therefore, the application program controller 35 transfers the input value included in the test information to the emulator 33 and the emulator 33 executes the application program by using the transferred input value. At this time, the application program controller 35 compares the output value included in the test information with an execution result value of the application program through the emulator 33 to verify whether or not the error occurs in the application program.

For example, the application program controller 35 determines that no error occurs in the application program when the execution result value of the application program and the output value of the test information coincide with each other. On the contrary, the application program controller 35 determines that the error occurs in the application program when the execution result value of the application program and the output value of the test information do not coincide with each other.

The application program controller 35 provides the results verifying whether or not the error occurs in the application program to the application program tester 27.

An operation of the application testing apparatus of the embedded system according to according to an embodiment of the present invention will be described below.

Figure 5:
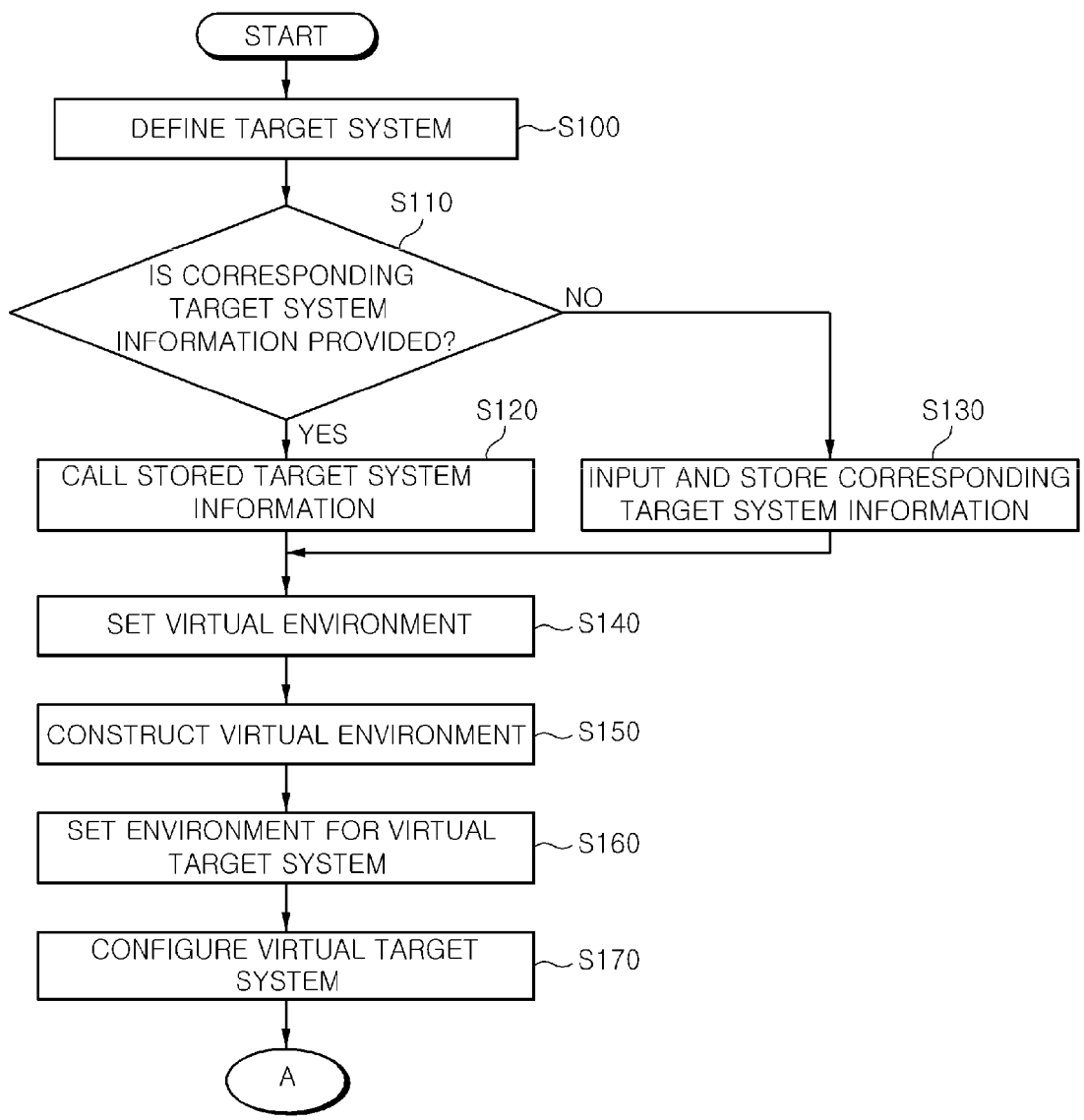
FIGS. 5 to 6 are flowcharts illustrating an operational flow of a method for application testing of an embedded system according to an embodiment of the present invention.
Figure 6:
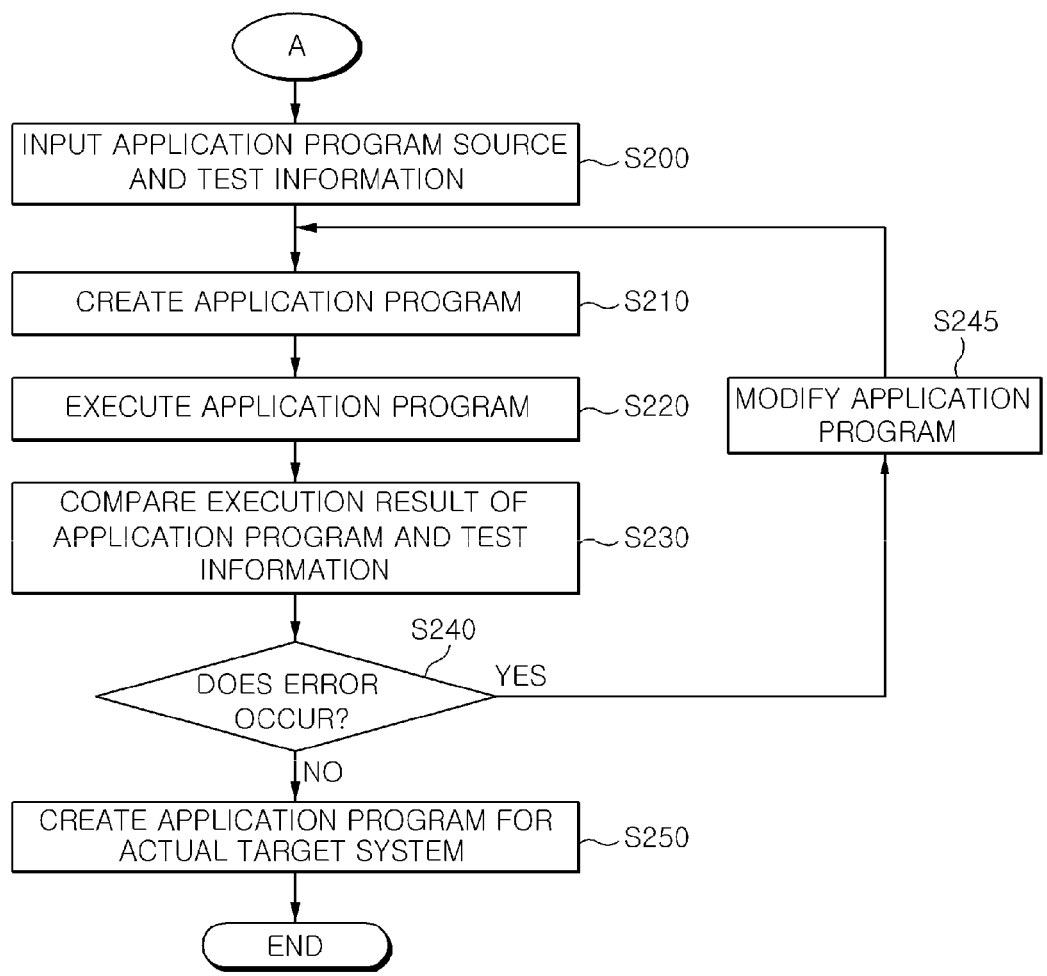

FIGS. 5 to 6 are flowcharts illustrating an operational flow of a method for application testing of an embedded system according to an embodiment of the present invention.

First, as shown in FIG. 5, when target system information and information required to develop an application program are inputted through a user interface 10, a corresponding testing apparatus defines the inputted information in an information storage 40 (S100).

Thereafter, when a request for developing a target system 2 is inputted through the user interface 10, it is verified whether or not information on the requested target system 2 is defined in the information storage 40 (S110).

If the request for developing the target system defined at step 'S100' or a previously registered target system is provided, the testing apparatus calls and provides the information of the corresponding target system 2 defined in the information storage 40 to a virtual cross-development environment manager 20 (S120).

Of course, when the information on the requested target system 2 is not defined in the information storage 40, the testing apparatus receives new information on the corresponding target system 2 through the user interface 10. At this time, the testing apparatus stores the inputted information in the information storage 40 (S130).

The virtual cross-development environment manager 20 sets virtual environment information on the basis of the information of the target system 2 which is called in the information storage 40 or inputted through the user interface 10 (S140) and constructs a virtual environment depending on the set information (S150). At this time, the virtual environment, as a virtual cross-development environment created depending on the characteristic of the target system 2, is constructed for each target system to be configured. Therefore, a plurality of virtual environments may be provided in the testing apparatus at the same time.

Thereafter, the virtual cross-development environment manager 20 provides the constructed virtual environment information to a virtual target environment manager 30.

The virtual target environment manager 30 sets a virtual target system environment in the virtual environment constructed by the virtual cross-development environment manager 20 (S160). At this time, an emulator 33 configures a virtual target system on the basis of the information on the target system 2 stored in the information storage 40 (S170). Herein, the virtual target system configured by the emulator 33 has the same environment as an actual target system 2 and may be provided in plural at the same time.

Thereafter, as shown in FIG. 6, the user interface 10 receives a source of an application program and test information to be adopted in the target system 2 from a user (S200). Herein, the test information is constituted by a pair of an input value and a result value. That is, the testing apparatus verifies whether or not the application program is normally executed without an error in the corresponding application program by comparing an input value included in the test information and a result value corresponding thereto with each other at the time of executing the application program.

The virtual cross-development environment manger 20 transfers the source of the application program source inputted at step 'S200' to an application program creator 25. At this time, the application program creator 25 creates the application program by using the source of the application program inputted through the user interface 10 in a virtual environment created by a virtual environment creator 23 (S210).

Thereafter, the application program tester 27 provides the application program created by the application program creator 25 at step 'S210' and the test information inputted through the user interface 10 at step 'S200' to the virtual target environment manager 30.

The virtual target environment manager 30 executes the application program in the virtual target system environment implemented at step 'S170' (S220).

At this time, an application program controller 35 compares the test information with an execution result of the application program to verify whether or not a result value corresponding to the input value included in the test information is acquired (S230). When the result value corresponding to the input value included in the test information is not outputted from the execution result of the application program, the application program controller 35 determines that an error occurs in the corresponding application program (S240). The application program controller 35 outputs the execution result of the application program to an application program tester 27.

Therefore, the application program tester 27 outputs the execution result of the application program to the outside and allows the user interface 10 to modify the source of the application program (S245). When the source of the application program is modified through the user interface 10, the process returns to step 'S210' and the steps from step 'S210' are performed.

Meanwhile, when the result value corresponding to the input value included in the test information is outputted from the execution result of the application program, the application program controller 35 determines that the corresponding application program is executed without an error in the virtual target system environment (S240). The application program controller 35 outputs the execution result of the application program to an application program tester 27.

Therefore, the virtual cross-development environment manager 20 creates and provides a final application program to be adopted in the actual target system through the application program creator 25 to the actual target system 2 (S250).

A user can conveniently develop an application program to be executed in various embedded systems to be finally produced by using an apparatus and a method for application testing of an embedded system according to an embodiment of the present invention.

Further, when an error occurs in the developed application program, it is possible to easily modify a problem by detecting the problem in a virtual target environment.

As described above, in an apparatus and a method for application testing of an embedded system according to the present invention, the configuration and method of the embodiments described as above can limitatively not be adopted, but the embodiments may be configured by selectively combining all the embodiments or some of the embodiments so that various modifications can be made.

What is claimed is:

1. An apparatus for application testing of an embedded system, comprising:
    a user interface that receives information of a target system, and test information including an input value required while executing an application program to be adopted in the target system and an output value corresponding to the input value;
    a virtual cross-development environment manager that constructs a virtual environment for testing the application program on the basis of the information of the target system inputted through the user interface; and
    a virtual target environment manager that configures a virtual target system corresponding to the target system in the virtual environment constructed by the virtual cross-development environment manager and executes the application program in the virtual target system by using the input value inputted through the user interface, and verifies whether or not an error occurs in the application program by comparing an execution result value of the application program with the output value inputted through the user interface.

2. The apparatus for application testing of an embedded system according to claim 1, wherein the virtual cross-development environment manager includes an application program creator that creates the application program in the virtual environment by using a source of the application program inputted through the user interface.

3. The apparatus for application testing of an embedded system according to claim 1, wherein the virtual cross-development environment manager further includes an application program tester that outputs a test result of the application program and controls to perform an operation corresponding to the test result.

4. The apparatus for application testing of an embedded system according to claim 1, wherein the virtual target environment manager includes an emulator that emulates the application program created by the virtual cross-development environment manager in the virtual target system.

5. The apparatus for application testing of an embedded system according to claim 1, wherein the virtual cross-development environment manager modifies the source of the application program or transmits the corresponding application program to the target system depending on whether or not the error occurs in the application program.

6. The apparatus for application testing of an embedded system according to claim 1, wherein the virtual cross-development environment manager constructs a plurality of virtual environments corresponding to a plurality of target systems, respectively.

7. The apparatus for application testing of an embedded system according to claim 1, further comprising:
an information storage that stores environment setting information of the target system and information on the application program.

8. A method for application testing of an embedded system, comprising:
receiving information of a target system, and test information including an input value required while executing an application program to be adopted in the target system and an output value corresponding to the input value;
constructing a virtual environment for testing the application program on the basis of the inputted information of the target system;
setting a virtual target system environment corresponding to the target system in the virtual target system environment and executing the application program in the virtual target system environment by using the inputted input value; and
verifying whether or not an error occurs in the application program in accordance with an execution result at the executing the application program by comparing an execution result value of the application program with the inputted output value.

9. The method for application testing of an embedded system according to claim 8, further comprising:
creating the application program in the virtual environment by receiving a source of the application program adopted in the target system.

10. The method for application testing of an embedded system according to claim 8, further comprising:
modifying the source of the application program when the error occurs in the application program from the verification result at verifying whether or not the error occurs in the application program.

11. The method for application testing of an embedded system according to claim 10, further comprising:
reverifying whether or not the error occurs in an application program created by adopting a source of the application program modified at modifying the source of the application program.

12. The method for application testing of an embedded system according to claim 8, further comprising:
transmitting the corresponding application program to the target system when no error occurs in the application program from the verification result at verifying whether or not the error occurs in the application program.

13. The method for application testing of an embedded system according to claim 8, wherein in constructing the virtual environment, a plurality of virtual environments corresponding to target systems are constructed.

* * * * *